United States Patent [19]
Park et al.

[11] Patent Number: 5,959,434
[45] Date of Patent: Sep. 28, 1999

[54] MECHANICAL CHARGING SELECTION APPARATUS

[75] Inventors: Chan Heung Park, Moraga; Sung Kee Baek, Martinez, both of Calif.

[73] Assignee: Advanced Mobile Solutions, Inc., Moraga, Calif.

[21] Appl. No.: 08/951,989

[22] Filed: Oct. 16, 1997

[51] Int. Cl.⁶ .................................................. H02J 7/00
[52] U.S. Cl. ................................. 320/113; 320/107
[58] Field of Search .................. 320/119, 107, 320/1.2, 1.5, 113

[56] References Cited

U.S. PATENT DOCUMENTS

| | | | |
|---|---|---|---|
| 4,636,703 | 1/1987 | Tohya et al. | 320/110 |
| 5,028,859 | 7/1991 | Johnson et al. | 320/125 |
| 5,187,422 | 2/1993 | Izenbaard et al. | 320/110 |
| 5,764,030 | 6/1998 | Gaza | 320/116 |
| 5,831,414 | 11/1998 | Yokata et al. | 320/112 |

*Primary Examiner*—Peter S. Wong
*Assistant Examiner*—Gregory J. Toatley, Jr.
*Attorney, Agent, or Firm*—Nathan P. Koenig; Crosby, Heafey, Roach & May

[57] ABSTRACT

A battery charger having multiple charging stations that automatically supplies charging current to one of the stations depending on which battery is inserted. The charger has electrical contacts that mate with the charging contacts of the primary battery and are movable between a first position and a second position. When in the second position, the charging circuitry delivers current to the primary battery and when in the first position, delivers current to an auxiliary battery.

3 Claims, 3 Drawing Sheets

MECHANICAL CHARGING SELECTION APPARATUS

FIELD OF THE INVENTION

This invention relates to a battery charger for rechargeable batteries. More particularly, this invention is directed to battery chargers having the ability to charge multiple batteries and to automatically switch charging current to the desired battery.

BACKGROUND OF THE INVENTION

A battery charger having the ability to accommodate more than one battery at a time represents a significant convenience for the user. However, conventional multiple battery chargers often require additional circuitry capable of supplying the additional batteries. Such chargers can also pose a safety problem if current is supplied to the charging contacts even if a battery is not present. Finally, simultaneously charging multiple batteries can generate significant heat which also poses potential safety issues. Some prior art designs allow a user to manually select which battery is charged, but such chargers are subject to user error and at the least require additional effort by the user to operate the devices.

Accordingly, there is a need for a battery charger capable of accommodating multiple batteries which automatically supplies charging current to the desired battery. There is also a need for a multiple battery charger which minimizes heat build-up. This invention satisfies these and other needs.

SUMMARY OF THE INVENTION

This invention comprises a battery charger having first and second charging stations, circuitry that provides current for charging a rechargeable battery, and a switch for automatically directing the charging current to either the first or second charging station depending on whether a battery is present. The switch comprises a mechanical spring contact actuated by insertion of a primary battery into the first charging station. In a preferred embodiment the switch comprises a contact formed of spring metal which is movable between a first closed position and a second open position. In these embodiments, the charger automatically, preferentially charges the primary battery whenever it is inserted into the charger. The charger housing is configured so that when the primary battery is secured into the first charging station, it displaces the spring contact from the closed position to the open position. When the primary battery is removed, the spring contact returns to the closed position and charging current is directed by the circuitry to an auxiliary battery at the second charging station.

DETAILED DESCRIPTION OF THE INVENTION

Figure 1:
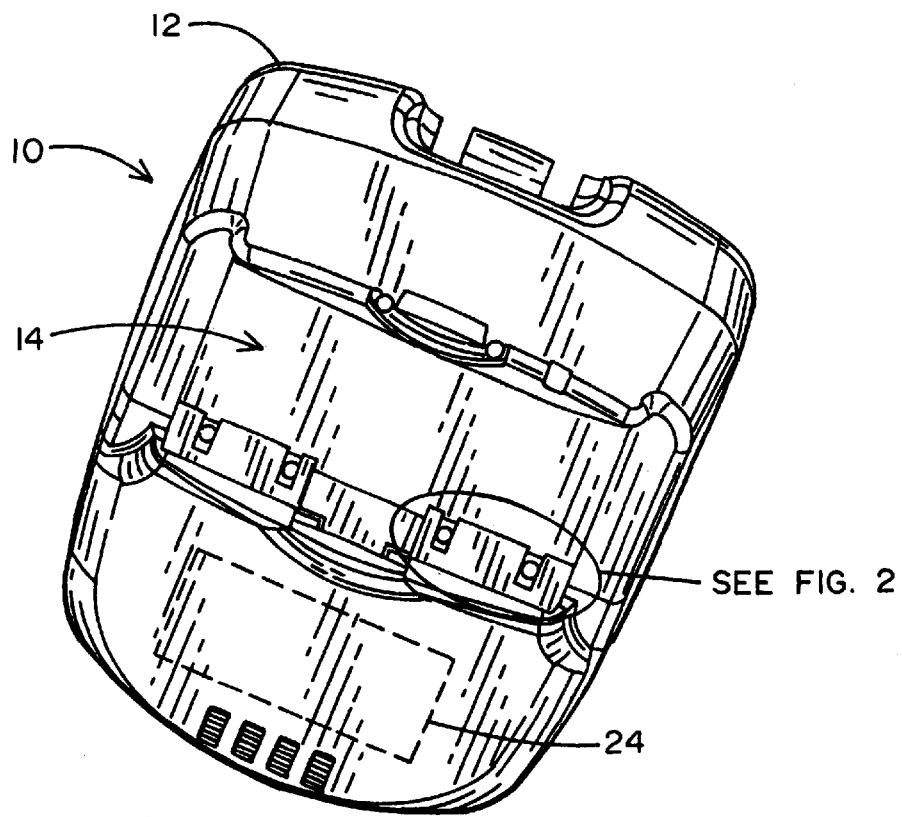
FIG. 1 is an isometric view of a battery charger embodying features of this invention.
Figure 2:
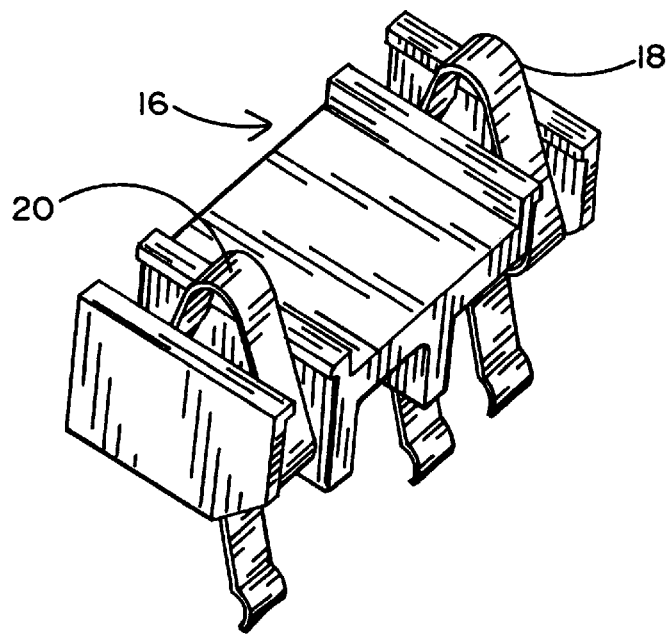
FIG. 2 is a detail view of an electrical contact assembly suitable for use in a battery charger of this invention.
Figure 3:
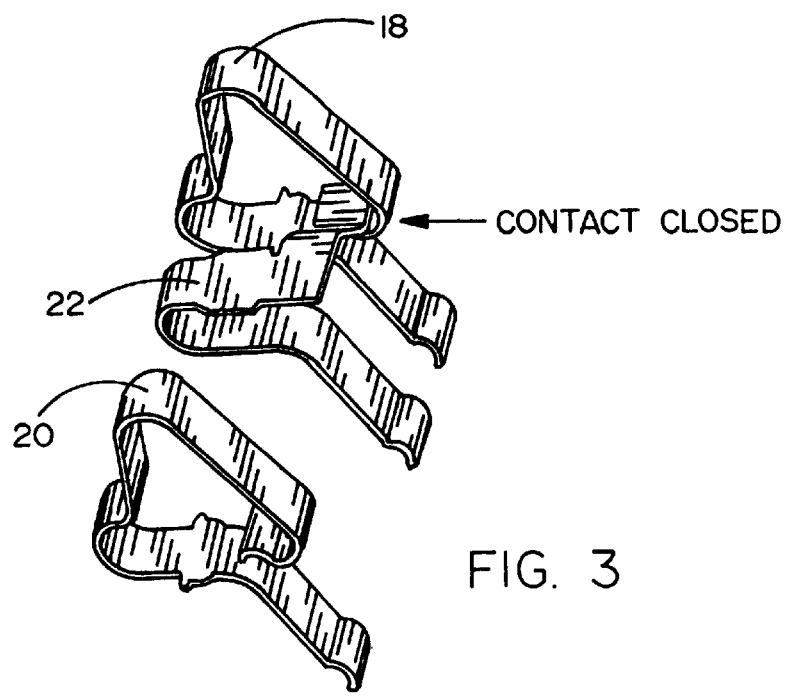
FIG. 3 shows the electrical contacts of this invention in the first closed position.
Figure 4:
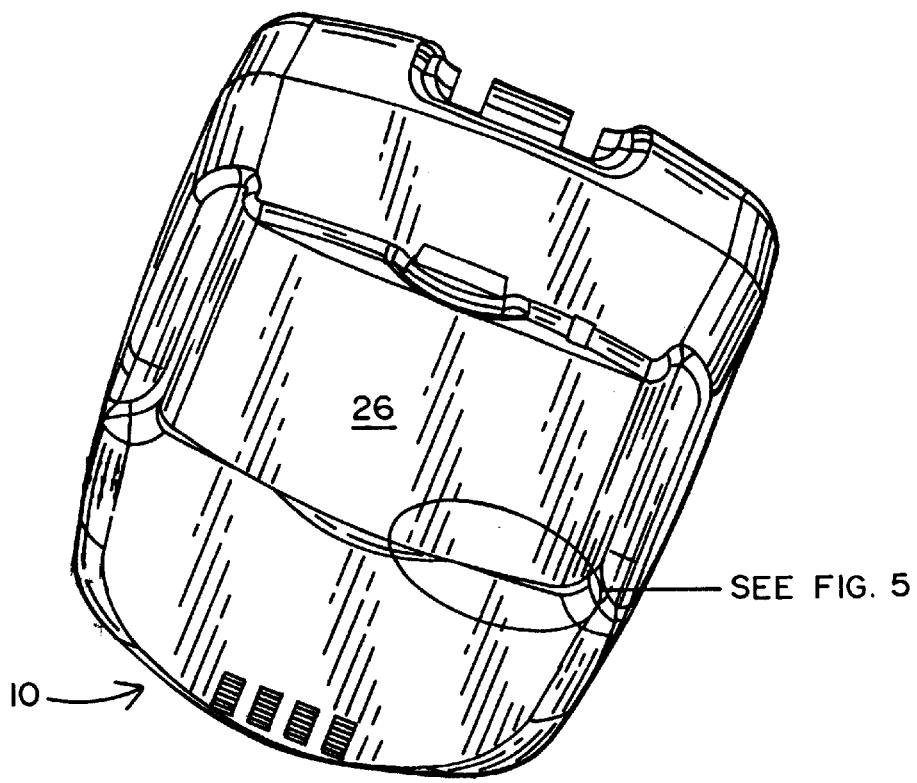
FIG. 4 is an isometric view of the battery charger with a primary battery in charging position.
Figure 5:
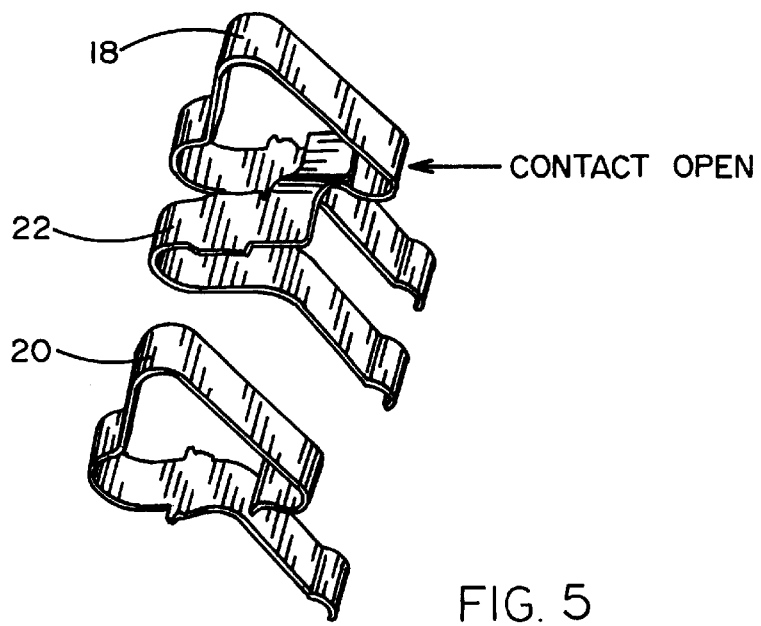
FIG. 5 shows the electrical contacts of this invention in the second open position.
Figure 6:
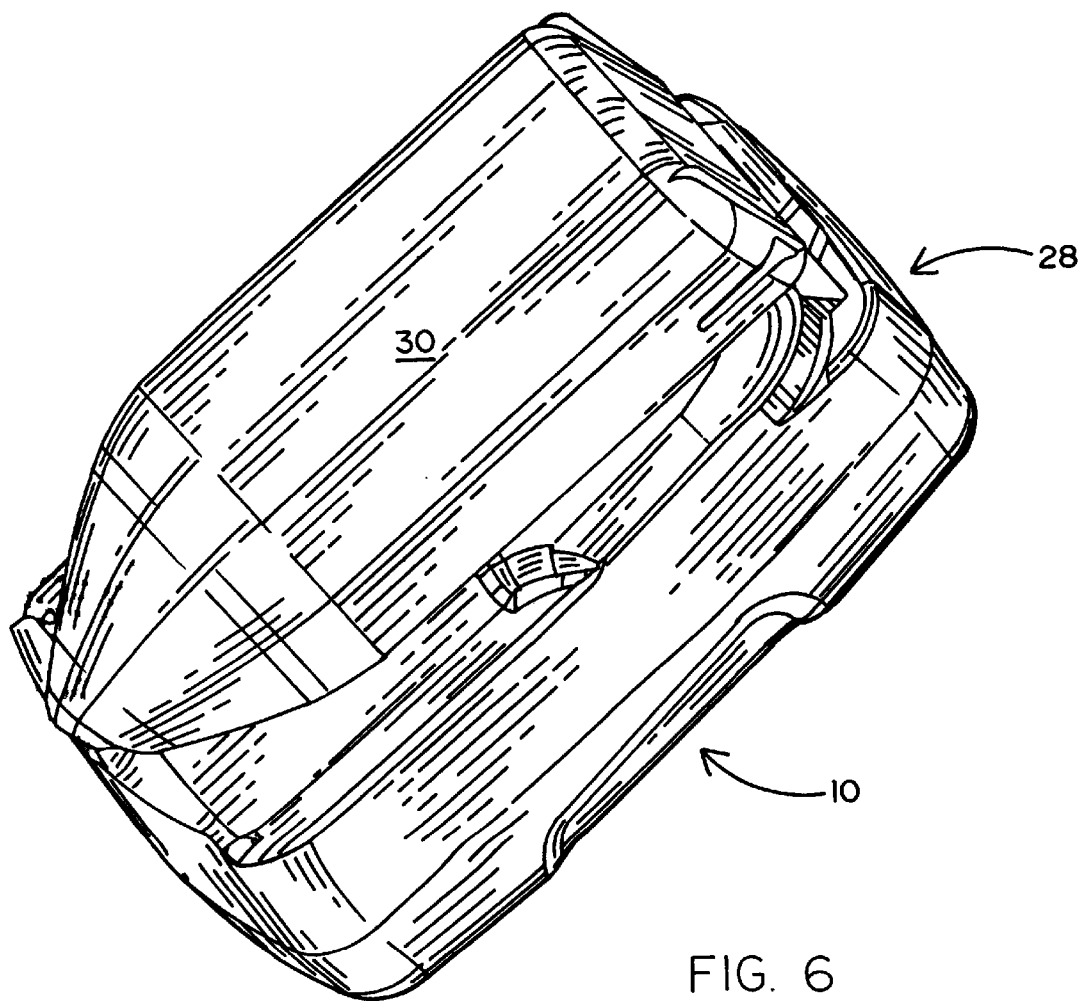
FIG. 6 is an isometric view of the battery charger with an auxiliary battery in charging position.

As shown in FIG. 1, a battery charger 10 embodying features of this invention comprises a housing 12 having a first charging station 14 configured to receive a primary battery 26. Housing 12 also contains charging circuitry 24, having electrical contacts 16, shown in detail in FIG. 2. FIG. 3 shows contacts 16 in isolation, which comprise a first and second conductive springs 18 and 20 that are configured to mate with charging contacts (not shown) of battery 26. Conductive spring 18 is movable between a first position shown in FIG. 3 and a second position shown in FIG. 5. In the first position, conductive spring 18 is configured to close an electrical connection with contact 22. With the insertion of battery 26 shown in FIG. 4, conductive spring 18 is displaced into the second, open position such that no electrical connection is made with contact 22. FIG. 6 shows auxiliary battery 30 mounted on top of charger 10 having a second charging station 28 for auxiliary battery 30.

When primary battery 26 is positioned in charging station 14, conductive spring 18 is displaced into the second, open position, and charging circuitry 24 delivers current through conductive springs 18 and 20 to primary battery 26. When no battery is in charging station 14, conductive spring 18 is in the first, closed position and charging circuitry 24 delivery current to second charging station 28 to charge auxiliary battery 30. In this way, battery charger 10 automatically switches charging current between primary 24 and auxiliary 30 batteries depending upon whether the battery is inserted into the charger. Thus, only one battery is charged at a time, simplifying the necessary charging circuitry and reducing heat generation. Moreover, in this configuration, the user only needs to place the primary battery 24 into the charger to preferentially charge the primary before the auxiliary. This simplifies the operation of the charger, especially when the characteristics of the batteries make the primary battery more desirable for constant use and the auxiliary more suitable for back up.

A general description of the device of the present invention as well as a preferred embodiment of the present invention has been set forth above. One skilled in the art will recognize and be able to practice many changes in many aspects of the device described above, including variations that fall within the teachings of this invention. The spirit and scope of the invention should be limited only as set forth in the claims which follow.

What is claimed is:

1. A battery charger comprising:
   a) a housing,
   b) a first and a second charging station,
   c) charging circuitry for delivering current to the charging stations; and
   d) a switch comprising electrical contacts in the housing configured to mate with a battery's charging contacts when the battery is positioned in the first charging station;

wherein the electrical contacts have a first position in which the charging circuitry delivers current to the second charging station and a second position in which the charging circuitry delivers current to the first charging station, such that insertion of a battery into the first charging station moves the electrical contacts from the first position to the second position.

2. The battery charger of claim 1, wherein the first charging station is configured to receive a first battery having charging contacts, such that insertion of the first battery causes the charging contacts of the first battery to mate with the electrical contacts and move the electrical contacts to the second position.

3. The battery charger of claim 1, wherein the electrical contacts comprise:

a) a conductive spring that is connected to the charging circuit, is configured to mate with the battery's charging contacts, and is movable between the first position and the second position; and b) a conductor that is connected to the charging circuity, wherein the conductor is electrically connected with the conductive spring when the conductive spring is in the first position and is not electrically connected with the conductive spring when the conductive spring is in the second position.

\* \* \* \* \*